(12) United States Patent
Xing et al.

(10) Patent No.: US 9,656,656 B2
(45) Date of Patent: May 23, 2017

(54) SYSTEM AND METHOD FOR REDUCING FUEL CONSUMPTION OF A WORK VEHICLE

(71) Applicant: CNH AMERICA LLC, New Holland, PA (US)

(72) Inventors: Yun Xing, Willowbrook, IL (US); Yanming Hou, Pleasant Prairie, WI (US); Haibo Guo, Naperville, IL (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 14/649,729

(22) PCT Filed: Sep. 13, 2013

(86) PCT No.: PCT/US2013/059659
§ 371 (c)(1),
(2) Date: Jun. 4, 2015

(87) PCT Pub. No.: WO2014/099061
PCT Pub. Date: Jun. 26, 2014

(65) Prior Publication Data
US 2015/0307077 A1    Oct. 29, 2015

Related U.S. Application Data

(60) Provisional application No. 61/740,159, filed on Dec. 20, 2012.

(51) Int. Cl.
*B60W 10/06*    (2006.01)
*B60W 10/103*   (2012.01)
(Continued)

(52) U.S. Cl.
CPC .......... *B60W 10/06* (2013.01); *B60W 10/103* (2013.01); *B60W 30/1882* (2013.01);
(Continued)

(58) Field of Classification Search
CPC ............... B60W 10/06; B60W 10/103; B60W 2510/106; B60W 2510/107;
(Continued)

(56) References Cited

U.S. PATENT DOCUMENTS 6,773,368 B1    8/2004  Williames
6,957,139 B2   10/2005  Bellinger
(Continued)

FOREIGN PATENT DOCUMENTS

DE    102006047954 A1      10/2006
DE    102006047954 A1  *   3/2008   ............ B60W 10/06
(Continued)

OTHER PUBLICATIONS

PCT International Search Report and Opinion, Dated: Mar. 17, 2014. (14 Pages).
(Continued)

*Primary Examiner* — Khoi Tran
*Assistant Examiner* — Robert Nguyen
(74) *Attorney, Agent, or Firm* — Rickard K. DeMille; Rebecca L. Henkel (57) ABSTRACT

In one aspect, a method for reducing fuel consumption of a work vehicle is disclosed. The method may generally include determining, with a controller, a load power requirement for the work vehicle, determining a plurality of candidate engine speeds at which the load power requirement is achievable, analyzing stored efficiency data for a transmission and at least one additional component of the work vehicle to determine a power loss value for each candidate engine speed, determining a candidate engine power for each candidate engine speed based on the load power requirement and the power loss values and analyzing stored fuel efficiency data based on the candidate engine powers to determine a target engine speed for the work vehicle.

17 Claims, 9 Drawing Sheets

(51) Int. Cl.
*B60W 30/188* (2012.01)
*F16H 61/462* (2010.01)
*F16H 61/47* (2010.01)

(52) U.S. Cl.
CPC ....... *B60W 30/1888* (2013.01); *F16H 61/462* (2013.01); *F16H 61/47* (2013.01); *B60W 2510/106* (2013.01); *B60W 2510/107* (2013.01); *B60W 2510/305* (2013.01); *B60W 2530/14* (2013.01); *B60W 2710/0644* (2013.01); *B60W 2710/0677* (2013.01); *B60Y 2200/221* (2013.01); *Y02T 10/76* (2013.01)

(58) Field of Classification Search
CPC ....... B60W 2510/305; B60W 2530/14; B60W 2710/0644; B60W 2710/0677; B60W 30/1882; B60W 30/1888; B60Y 2200/221; F16H 61/462; F16H 61/47; Y02T 10/76
USPC .......................................................... 701/50
See application file for complete search history.

(56) References Cited

U.S. PATENT DOCUMENTS

| | | | |
|---|---|---|---|
| 6,965,826 B2 | 11/2005 | Andres et al. | |
| 7,072,763 B2 | 7/2006 | Saxon et al. | |
| 7,678,015 B2 | 3/2010 | Funke et al. | |
| 7,684,919 B2 | 3/2010 | AbuSamra | |
| 7,756,623 B2 | 7/2010 | Jarrett et al. | |
| 7,765,058 B2 | 7/2010 | Doering | |
| 7,789,795 B2 | 9/2010 | McKenzie et al. | |
| 7,873,452 B2 | 1/2011 | Hawkins et al. | |
| 7,966,115 B2 | 6/2011 | Bellinger | |
| 8,057,354 B2 | 11/2011 | Frank et al. | |
| 8,380,407 B2 | 2/2013 | Mutschler et al. | |
| 2007/0254771 A1 | 11/2007 | Funke et al. | |
| 2008/0125286 A1 | 5/2008 | Pruitt et al. | |
| 2010/0087993 A1 | 4/2010 | Roli et al. | |
| 2010/0174456 A1 | 7/2010 | Beaudoin et al. | |
| 2010/0324791 A1* | 12/2010 | Mutschler | E02F 9/2235 701/58 |
| 2013/0268150 A1* | 10/2013 | Weslati | G06F 17/00 701/22 |
| 2014/0046563 A1* | 2/2014 | Minami | B60W 10/02 701/68 |

FOREIGN PATENT DOCUMENTS

| | | |
|---|---|---|
| DE | 102010052065 A1 | 11/2010 |
| DE | 102010052065 A1 | 5/2012 |
| EP | 1754643 A1 | 2/2007 |
| EP | 1754643 B1 | 10/2009 |
| EP | 2428419 A1 | 3/2012 |

OTHER PUBLICATIONS

NPL-Hellstro M Design. (Website) Dated Jun. 4, 2015. (3 Pages).
NPL-Kautzmann Self-Optimizing Machine Management. Various Reference Dates. (9 Pages).
NPL-STOJIC et al. The Role of the Mechatronics in Technology. Bulletin of Engineering Tome IV (Year 2011). (4 Pages).
PCT International Search Report, regarding application No. PCT/US2013/059659, dated Jul. 2, 2015, 9 pages.

* cited by examiner

| CANDIDATE ENGINE SPEEDS (RPM) | FORECASTED LOAD POWER REQUIREMENT (Kw) | ASSOCIATED SYSTEM POWER LOSS (Kw) | CANDIDATE ENGINE POWER (Kw) | CANDIDATE ENGINE TORQUE (Nm) | ENGINE BSFC EFFICIENCY (g/km-h) | FUEL CONSUMPTION (g/h) |
|---|---|---|---|---|---|---|
| 1500 | 150 | 15 | 165 | 1050 | 212 | 34980 |
| 1600 | 150 | 24 | 174 | 1038 | 200 | 34800 |
| 1700 | 150 | 33 | 183 | 1028 | 205 | 37515 |
| ..... | ..... | ..... | ..... | ..... | ..... | ..... |

SYSTEM AND METHOD FOR REDUCING FUEL CONSUMPTION OF A WORK VEHICLE

CROSS-REFERENCE TO RELATED APPLICATIONS

This application is a national phase application of International Application No. PCT/US13/59659, filed on Sep. 13, 2013, which is based upon and claims priority to U.S. Provisional Application No. 61/740,159, filed on Dec. 20, 2012, the disclosures of both of which are hereby incorporated by reference herein in their entirety for all purposes.

FIELD OF THE INVENTION

The present subject matter relates generally to work vehicles and, more particularly, to a system and method for reducing the fuel consumption of a work vehicle.

BACKGROUND OF THE INVENTION

Current work vehicles, such as tractors and other agricultural vehicles, include an electronically controlled engine and a transmission, such as a power shift transmission (PST) or a continuously variable transmission (CVT). CVTs generally allow for enhanced performance by providing continuous and smooth gear ratio changes. Typically, CVTs have a hydro-mechanical configuration such that power from the engine flows in parallel through both a hydrostatic branch and a mechanical branch. In addition, CVTs may include multiple speed ranges to gain finer ratio control and to extend the ground speed range. Ratio changes are made within each speed range by changing the swash plate angle of a hydraulic pump of the hydrostatic branch. Additionally, range changes within the CVT are seamless.

While the efficiency characteristics of conventional engines are relatively straight forward, the efficiencies of a CVT are much more complicated. Specifically, the required swash plate angle for a given ground speed generally varies depending on the specific range clutches engaged within the transmission. Moreover, the transmission efficiency generally varies distinctly within each range. Thus, significant differences in the operating efficiency of a CVT may be achieved for a given ground speed. In addition, the loads on other power consuming components of a work vehicle, such as the power take-off, hydraulic accessories, drive axle and/or the like, are typically complex and highly dynamic in nature. Thus, selecting the optimal operational settings in order to achieve the desired productivity and minimize fuel consumption can be quite challenging.

In current control systems, algorithms have been developed that focus solely on the engine speed control strategy. For example, engine speed is typically controlled based on the vehicle loads, with the engine running at its most efficient settings when loads are relatively low. Unfortunately, such control algorithms fail to take into account the role that other vehicle components play in impacting the overall efficiency of the vehicle.

Accordingly, a system and method for reducing the fuel consumption of a work vehicle that takes into account the operating efficiencies of the engine, transmission and various other power consuming components of the vehicle would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for reducing the fuel consumption of a work vehicle. The method may generally include determining, with a controller, a load power requirement for the work vehicle, determining a plurality of candidate engine speeds at which the load power requirement is achievable, analyzing stored efficiency data for a transmission and at least one additional component of the work vehicle to determine a power loss value for each candidate engine speed, determining a candidate engine power for each candidate engine speed based on the load power requirement and the power loss values and analyzing stored fuel efficiency data based on the candidate engine powers to determine a target engine speed for the work vehicle.

In another aspect, the present subject matter is directed to a method for reducing the fuel consumption. The method may generally include determining, with a controller, a load power requirement for the work vehicle, analyzing stored efficiency data for a transmission and at least one additional component of the work vehicle to determine a plurality of power loss values associated with achieving the load power requirement, determining candidate engine settings based on the load power requirement and the power loss values and analyzing stored fuel efficiency data based on the candidate engine settings to determine a target engine speed for the work vehicle.

In a further aspect, the present subject matter is directed to a system for reducing the fuel consumption of a work vehicle. The system may generally include an engine and a transmission coupled to the engine. In addition, the controller may include a controller communicatively coupled to the engine and the transmission. The controller may be configured to determine a load power requirement for the work vehicle, determine a plurality of candidate engine speeds at which the load power requirement is achievable, analyze stored efficiency data for the transmission and at least one additional component of the work vehicle to determine a power loss value for each candidate engine speed, determine a candidate engine power for each candidate engine speed based on the load power requirement and the power loss values and analyze stored fuel efficiency data for the engine based on the candidate engine powers to determine a target engine speed for the work vehicle.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for reducing the fuel consumption of a work vehicle. Specifically, the disclosed system and method may be utilized to minimize fuel consumption while maintaining the desired performance and productivity of the work vehicle. For example, in several embodiments, the load power requirement for the work vehicle may be determined and used to analyze the component efficiencies of various power consuming components of the vehicle, such as the transmission, power take-off, drive axle assembly and fan of the work vehicle. Based on the load power requirement and the calculated power consumption of such components, a plurality of candidate engine settings (e.g., pairs of specific engine speeds and engine torques) may be selected and analyzed to determine which engine settings may be used as the target engine settings for minimizing fuel consumption. The engine operation may then be controlled based on the target engine settings and the transmission ratio of the transmission may be adjusted to achieve a desired ground speed for the work vehicle.

Figure 1:
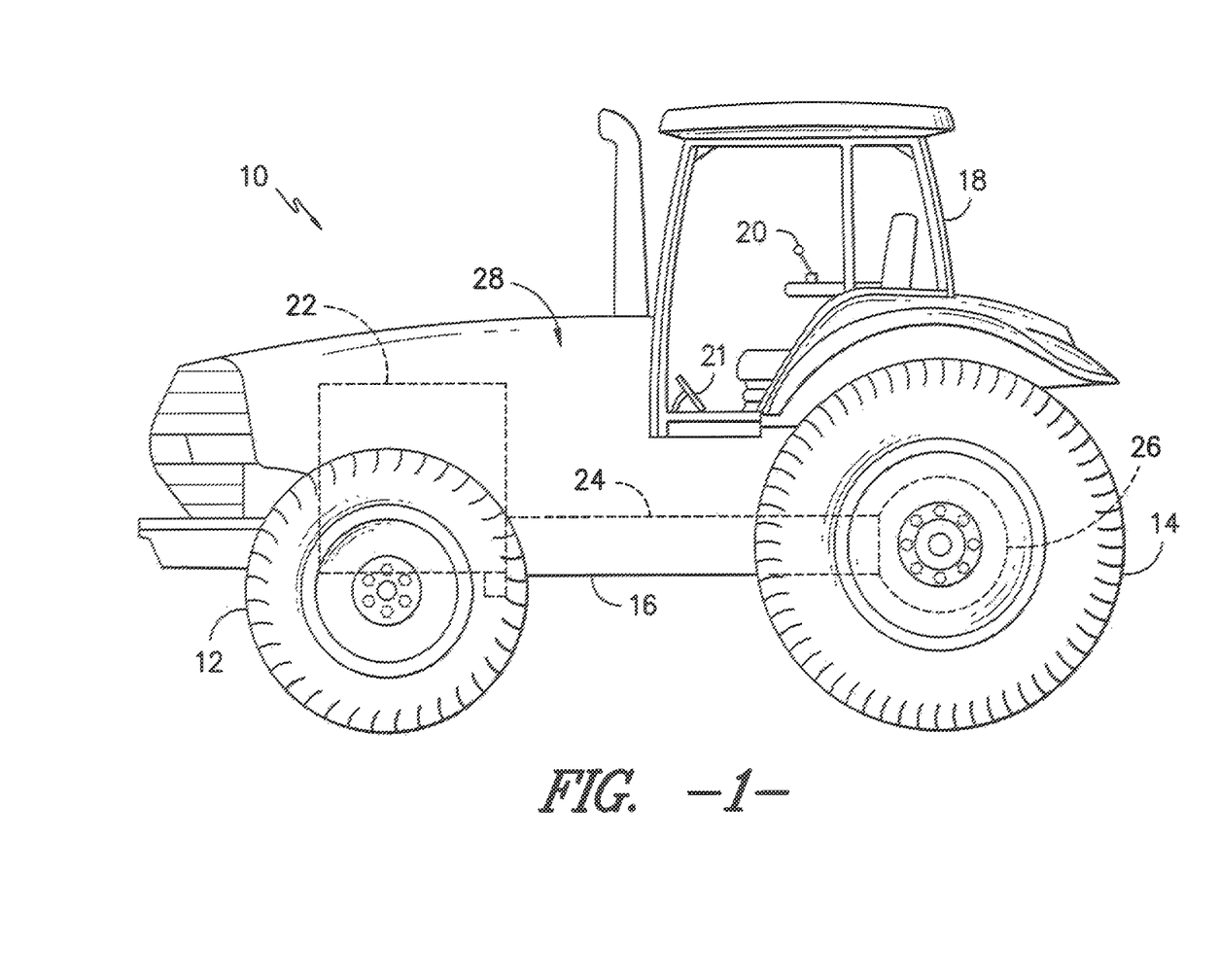
FIG. 1 illustrates a side view of one embodiment of a work vehicle.

Referring now to the drawings, FIG. 1 illustrates a side view of one embodiment of a work vehicle 10. As shown, the work vehicle 10 is configured as an agricultural tractor. However, in other embodiments, the work vehicle 10 may be configured as any other suitable work vehicle known in the art, such as various other agricultural vehicles, earth-moving vehicles, loaders and/or various other off-road vehicles.

As shown in FIG. 1, the work vehicle 10 includes a pair of front wheels 12, a pair or rear wheels 14 and a chassis 16 coupled to and supported by the wheels 12, 14. An operator's cab 18 may be supported by a portion of the chassis 16 and may house various input devices, such as a control lever 20 and/or a foot pedal 21, for permitting an operator to control the operation of the work vehicle 10. Additionally, the work vehicle 10 may include an engine 22 and a transmission 24 mounted on the chassis 16. The transmission 24 may be operably coupled to the engine 22 and may provide variably adjusted gear ratios for transferring engine power to the wheels 14 via a drive axle assembly 26. The engine 22, transmission 24, and drive axle assembly 26 may collectively define a drive train 28 of the work vehicle 10.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration 10. For example, in an alternative embodiment, a separate frame or chassis may be provided to which the engine 22, transmission 24, and drive axle assembly 26 are coupled, a configuration common in smaller tractors. Still other configurations may use an articulated chassis to steer the work vehicle 10, or rely on tracks in lieu of the wheels 12, 14. Additionally, although not shown, the work vehicle 10 may also be configured to be operably coupled to any suitable type of work implement, such as a trailer, spray boom, manure tank, feed grinder, plow and/or the like.

Figure 2:
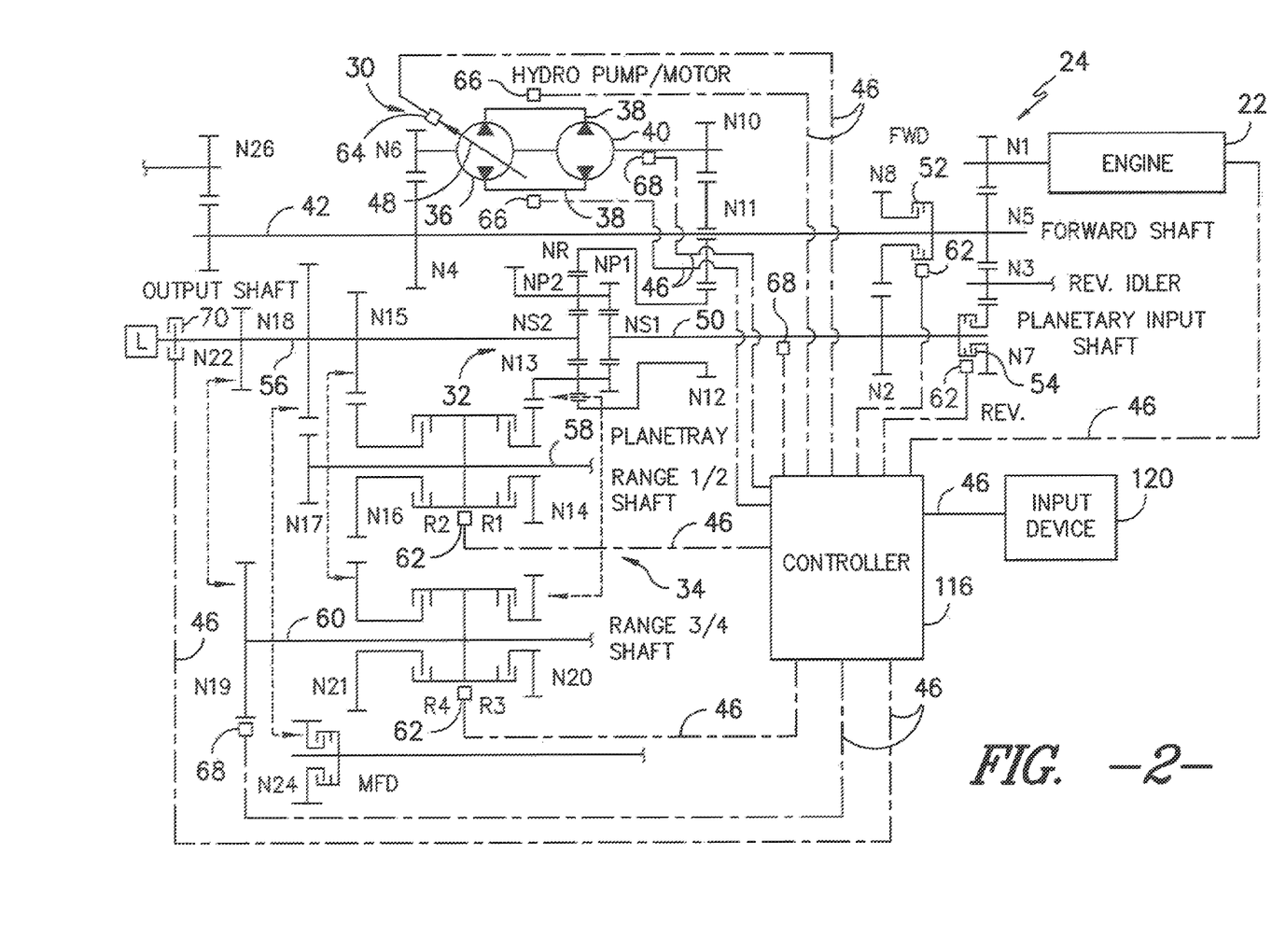
FIG. 2 illustrates a schematic view of one embodiment of a transmission suitable for use with the work vehicle shown in FIG. 1.

Referring now to FIG. 2, a simplified, schematic diagram of one embodiment of a continuously variable transmission 24 suitable for use with the work vehicle 10 described above is illustrated in accordance with aspects of the present subject matter. As shown, the transmission 24 may include a hydrostatic unit 30 and a planetary unit 32. The hydrostatic unit 30 and the planetary unit 32 may be coupled to a driveline including a range gear set 34 and may also be coupled to a load L. For example, in one embodiment, the load L may correspond to the drive wheels of the work vehicle 10 (e.g., the front and/or rear wheels 12, 14 of the work vehicle 10). Alternatively, the hydrostatic unit 30 and the planetary unit 32 may be coupled to any other suitable load L, such as loads that include a track drive or a separate operating system of the work vehicle 10 (e.g., a power take-off (PTO)).

The hydrostatic unit 30 of the transmission 10 may generally include a hydraulic pump 36 coupled by fluid conduits 38 in a closed loop to a hydraulic motor 40. The motor 40 may be coupled to the engine 22 via an input gear N6. Specifically, as shown in FIG. 2, power may be transmitted to the hydrostatic unit 30 by a driven gear N4 mounted on a forward shaft 42 of the transmission 10 and engaged with the input gear N6. In addition, an output gear N10 for the hydrostatic unit 30 may be connected to a ring gear NR of the planetary unit 32 via gears N11 and N12.

In general, the pump 36 may comprise any suitable electronically controlled pump known in the art, such as an electronically controlled variable displacement hydraulic pump. As such, operation of the pump 36 may be automatically controlled using an electronic controller 116 of the work machine 10. For example, as shown in FIG. 2, the controller 116 may be communicatively coupled to the pump 36 via a suitable communicative link 46 so that the angle of a swash plate of the pump 36 (the swash plate being denoted by a diagonal arrow 48 through pump 36) may be adjusted through a range of positions, thereby adjusting the transmission ratio of the transmission 24.

Referring still to FIG. 2, the planetary unit 32 of the transmission 24 may generally include a primary sun gear NS1 mounted on a planetary input shaft 50. As shown, the planetary input shaft 50 may be coupled to the engine 22 via a forward directional clutch 52 or a reverse directional clutch 54. In addition, the planetary unit 32 may be configured to be selectively coupled to the load L, coupled to the hydrostatic unit 30 and selectively coupled to the engine 22, all under automatic control of the controller 116. For example, for coupling the planetary unit 32 to the load L, the transmission 24 may include an output shaft 56 coupled to the load L which carries an input gear N18 engaged with an output gear N17 on a range ½ shaft 58 of the range gear set 34 and a gear N22 engaged with a gear N19 on a range ¾ shaft 60 of the range gear set 34. The range ½ shaft 58 may, in turn, be coupled to the planetary unit 32 via automatic operation of range selectors or clutches R1 and R2 for power flow through gears N13 and N14, or N15 and N16, respectively. Similarly, the range ¾ shaft 60 may be coupled to the planetary unit 32 via range selectors or clutches R3 and R4 for power flow via gears N13 and N20, or N15 and N21, respectively. The range ½ and ¾ shafts 58, 60 may also be simultaneously coupled to the planetary unit 32 to provide dual power flow. It should be appreciated that operation of the various clutches (e.g., the forward directional clutch 52, the reverse directional clutch 54, and clutches R1, R2, R3 and R4) may be automatically controlled by the controller 116 using suitable actuators 62 communicatively coupled to the controller 116 via suitable communicative links 46.

The controller 116 may also be communicatively coupled to a swash plate actuator 64 for automatically controlling the angle of the swash plate of the pump 36. For example, the actuator 64 may be configured to move the swash plate across a range of angles in response to control signals received from the controller 116. In addition, the controller 116 may be coupled to any number of sensors for monitoring the various operating parameters of the transmission 24 including, but not limited to, pressure sensors 66 for sensing the pressure within the conduits 38 connecting the pump 36 to the motor 40 and/or for sensing the pressure of the hydraulic fluid within the various clutches of the transmission 24, speed sensors 68 for sensing speeds of the various shafts of the transmission 24 and/or any other suitable sensors. Similarly, the controller 116 may also be connected to the engine 22 (e.g., a speed governor of the engine 22) for receiving engine speed data and other information therefrom.

Additionally, as shown in FIG. 2, the controller 116 may also be communicatively coupled to one or more operator-controlled input device(s) 120 positioned within the cab 18 via a suitable communicative link 46. For example, as will be described below, the work vehicle 10 may include an input device 120 (e.g., the control lever 20 and/or foot pedal 21 shown in FIG. 1) that allows the operator to provide a speed command to the controller 116 corresponding to a desired ground speed for the vehicle 10.

During operation, the transmission 24 may be operated to have a combined hydrostatic and mechanical power flow by engaging the reverse directional clutch 54 to the power planetary unit 32 via gears N1, N3, N5 and N7 or by engaging the forward directional clutch 52 to power the planetary unit 32 via gears N1, N8, and N2. Alternatively, the transmission 44 may be operated to have a pure hydrostatic power flow by disengaging both of the directional clutches 52, 54. Regardless, the transmission 24 may provide a seamless transition between ranges to provide work/road configurations as desired. In particular, speed changes from zero to the maximum speed within each speed range of the transmission 24 may be achieved in a smooth and continuous manner by automatically changing the swash plate angle of the pump 36 via control signals transmitted from the controller 116.

Referring still to FIG. 2, the transmission 24 may also include a parking brake 70 operably positioned on the load shaft 56. In several embodiments, the parking brake 70 may be communicatively coupled to the controller 116 (via a suitable communicative link 46) for automatic control thereof. For example, the controller 116 may be configured to proportionally or gradually engage the parking brake 70 as well as gradually release or disengage the parking brake 70. In such embodiments, the pressure of the hydraulic fluid supplied to the parking brake 70 may be controlled using an automatic valve (e.g., a proportional pressure reducing valve) configured to be operated via control signals transmitted from the controller 116. As is generally understood, the parking brake pressure may be inversely related to the parking brake torque. Thus, contrary to the various clutches of the transmission 24, the parking brake 70 may be designed such that it is engaged when the pressure within the brake 70 is reduced and disengaged when the pressure within the brake 70 is increased.

It should be appreciated that the configuration of the transmission 24 shown in FIG. 2 simply illustrates one example of a suitable transmission with which the disclosed system and method may be utilized. Thus, one of ordinary skill in the art should appreciate that application of the present subject matter need not be limited to the particular transmission 24 shown in FIG. 2, but, rather, the present subject matter may be advantageously used with various types/configurations of transmissions. For example, in addition to a continuously variable transmission, the disclosed system and method may also be advantageously applied to a work vehicle 10 including a power shift transmission.

Figure 3:
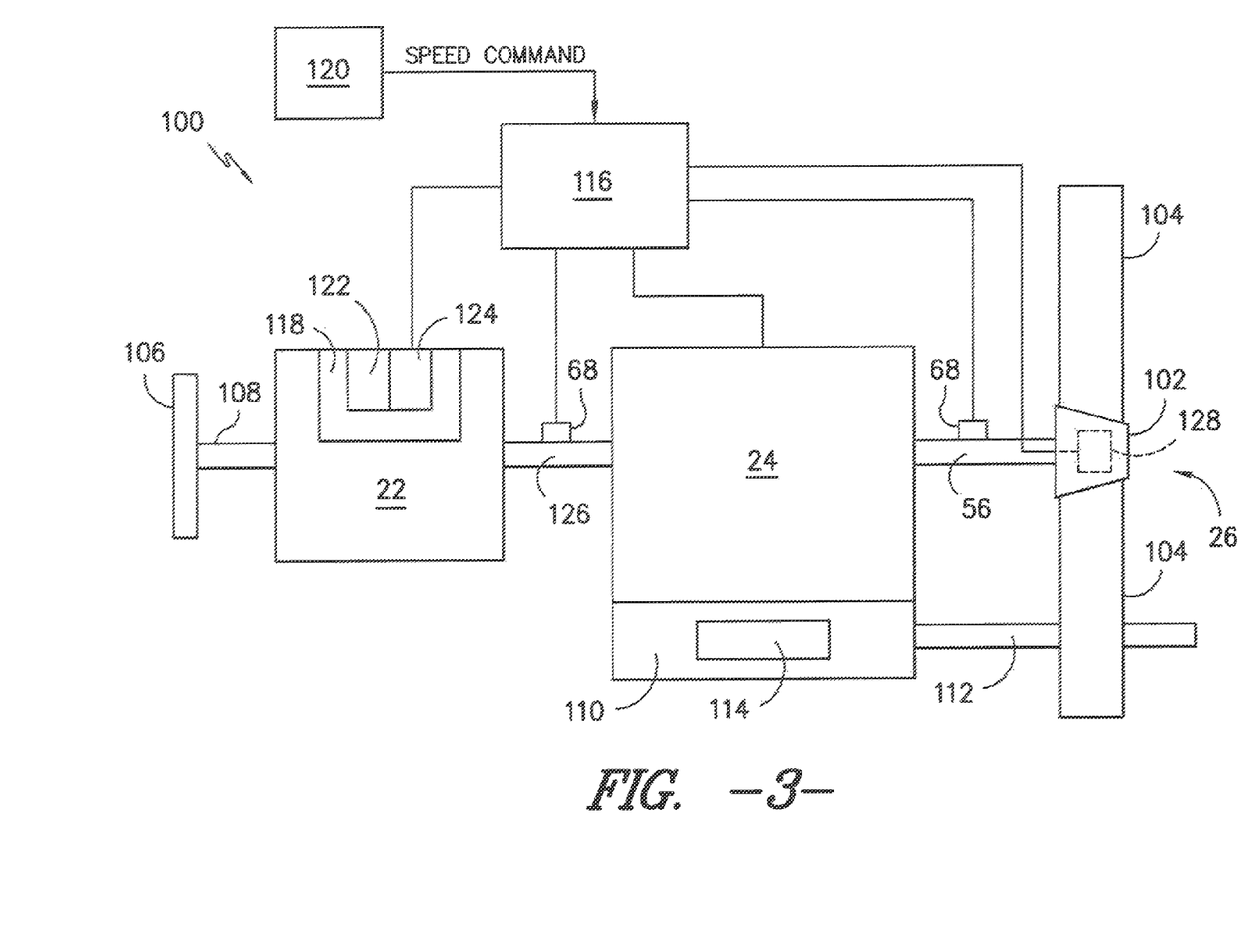
FIG. 3 illustrates a schematic view of one embodiment of a system for reducing the fuel consumption of a work vehicle in accordance with aspects of the present subject matter.

Referring now to FIG. 3, a schematic diagram of one embodiment of a system 100 for reducing the fuel consumption of a work vehicle 10 is illustrated in accordance with aspects of the present subject matter. As shown, the system 100 may include various drive train components of the work vehicle 10, such as the engine 22, the transmission 24 and the drive axle assembly 26. As is generally understood, the drive axle assembly 26 may include a differential 102 coupled to the transmission output shaft 56 and one or more axle shafts 104 coupled to the differential 102 for transferring power to the drive wheels of the vehicle 10 (e.g., the rear wheels 14).

Additionally, the system 100 may include various other power consuming components of the work vehicle 10. For example, as shown in FIG. 3, the system 100 may include a fan 106 coupled to an output shaft 108 of the engine 22 for generating an airflow through a cooling system (not shown) of the work vehicle 10. Moreover, the system 100 may also include a power take-off (PTO) 110 configured to transfer power from the engine 22 to one or more implements via a PTO shaft 112. For instance, as shown in FIG. 3, in one embodiment, the PTO 110 may form part of the transmission 22 and may be configured to be engaged via a PTO clutch 114.

As will be described below, the various drive train components and other power consuming components of the work vehicle 10 may generally operate at different efficiencies, with each component consuming varying amounts of power at differing vehicle operating parameters. As such, the most efficient operating conditions for one component may result in decreased efficiency for one or more other vehicle components. For example, the efficiency of the transmission 24 may be relatively low when the engine settings (i.e., engine speed and engine torque) are selected to provide the most fuel efficient engine operation. Thus, in accordance with aspects of the present subject matter, the disclosed system 100 and method 200 (FIG. 4) may be utilized to enhance fuel efficiency and achieve performance/productivity requirements by taking into account the individual component efficiencies of the various power consuming components of the work vehicle 10.

As shown in FIG. 3, the system 100 may also include a controller 116 configured to control the operation of one or more components of the work vehicle 10, such as the engine 22 and the transmission 24. For example, the controller 116 may be communicatively coupled to an engine governor 118 in order to control and/or monitor the speed of the engine 22. Similarly, as indicated above, the controller 116 may be coupled to various components of the transmission 22 (e.g., the clutch actuators 62 and/or the swash plate actuator 64) in order to control the transmission 24 in a manner that provides a continuously variable transmission ratio.

It should be appreciated the controller 116 may generally comprise any suitable processor-based device known in the art. Thus, in several embodiments, the controller 116 may include one or more processor(s) and associated memory device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) of the controller 116 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the controller 116 to perform various computer-implemented functions, such as the method 200 described below with reference to FIG. 4. In addition, the controller 116 may also include various other suitable components, such as a communications circuit or module, one or more input/output channels, a data/control bus and/or the like.

It should also be appreciated that the controller 116 may correspond to an existing controller of the work vehicle 10 (e.g., an existing engine and/or transmission controller) or the controller 116 may correspond to a separate controller 116. For instance, in one embodiment, the controller 116 may form all or part of a separate plug-in module that may be installed within the work vehicle 10 to allow for the disclosed system and method to be implemented without requiring additional software to be uploaded onto existing control devices of the vehicle 10.

The system 100 may also include one or more input devices 120 communicatively coupled to the controller 116 to allow for operator inputs to be provided to the system 100. For example, as indicated above, the work vehicle 10 may include an input device 120 configured to permit an operator to input a speed command corresponding to a desired ground speed of the vehicle 10. Upon receipt of the speed command, the controller 116 may be configured to control the various components of the work vehicle 10 in order to achieve the commanded ground speed. For example, the controller 116 may be configured to regulate the engine speed and/or the transmission ratio to adjust the speed of work vehicle 10 to the commanded ground speed.

Additionally, the system 100 may include one or more sensors for monitoring various operating parameters of the work vehicle 10. For example, as shown in FIG. 3, the controller 102 may be communicatively coupled to various sensors, such as a torque sensor 122 and/or a speed sensor 124, mounted on and/or within the engine 22 for monitoring the engine torque loads and/or the engine speed. In one embodiment, the sensor(s) 122, 124 may comprise an internal sensor of the engine governor 118. In another embodiment, the sensor(s) 122, 124 may comprise a separate sensor(s) configured to monitor the torque loads and/or the speed of the engine 22.

Moreover, as indicated above, the system 100 may also include one or more sensors 68 (e.g., shaft encoders, shaft sensors and/or any other suitable speed sensors) configured to monitor the rotational speeds of the various shafts of the transmission 24. For example, as shown in FIG. 3, the transmission 24 may include a speed sensor 68 mounted to and/or within the transmission input shaft 126 and/or the transmission output shaft 56 to measure the input and/or output speeds of the transmission. The speed sensors 68 may, in turn, be communicatively coupled to the controller 116 to permit the speed measurements to be transmitted to the controller 116 for subsequent processing and/or analysis.

In addition, the system 100 may include various other sensors configured to monitor any other suitable operating parameters of the work vehicle 10. For example, in one embodiment, a sensor 128 may be associated with the drive axle assembly 26 for monitoring one or more operating parameters of the assembly 26, such as a torque load transmitted through the assembly 26, a rotational speed of one or more components of the assembly 26 and/or an axle temperature associated with the assembly 26. Moreover, the work vehicle 10 may include a sensor (not shown) for monitoring the ground speed of the vehicle 10.

Figure 4:
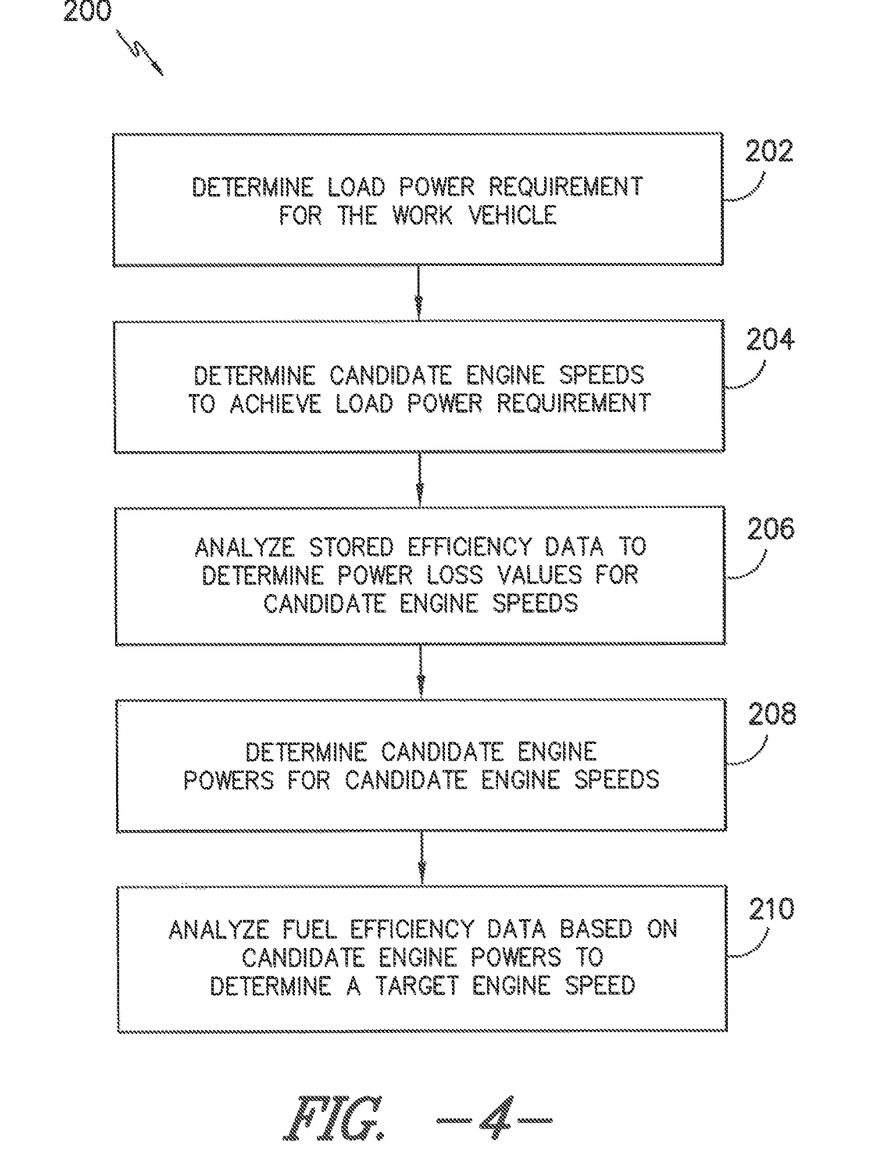
FIG. 4 illustrates a flow diagram of one embodiment of a method for reducing the fuel consumption of a work vehicle in accordance with aspects of the present subject matter.

Referring now to FIG. 4, a flow diagram of one embodiment of a method 200 for reducing the fuel consumption of a work vehicle 10 is illustrated in accordance with aspects of the present subject matter. In general, the method 200 may allow for a work vehicle 10 to be controlled in a manner that minimizes fuel consumption while maintaining the desired vehicle performance/productivity. Specifically, in several embodiments, the method 200 may allow for a candidate pool of engine settings (e.g., candidate engine speeds and/or torques) to be generated by analyzing both the load conditions of the work vehicle 10 and the individual efficiencies of various vehicle components. The candidate engine settings may then be analyzed to determine the specific engine settings at which the vehicle's fuel consumption is minimized. The engine operation may then be set to the specific engine settings and the transmission ratio may be adjusted such that the desired vehicle performance/productivity is maintained.

It should be appreciated that, as indicated above, the controller 116 may be configured to receive a speed command signal from the operator corresponding to a desired ground speed for the work vehicle 10. Thus, in several embodiments, the disclosed method 200 may be initiated once the desired ground speed has been achieved. For example, upon receipt of speed command signal, the controller 116 may be configured to initially control the operation of the engine 22 and/or the transmission 24 (e.g., by regulating the engine speed and/or the transmission ratio) to adjust the vehicle's speed to the desired ground speed. Thereafter, the disclosed method 200 may be used to enhance the vehicle's fuel efficiency while ensuring that the vehicle 10 is maintained at the desired ground speed.

As shown in FIG. 4, at 202, a load power requirement for the work vehicle 10 may be determined. The load power requirement generally corresponds to the amount of power required for the vehicle 10 to finish useful work, which may be a function of numerous factors, such as the weight of the work vehicle 10, the type of implement being hauled by the vehicle 10, field conditions and/or the like. As will be described below, both a current load power requirement and a future load power requirement may be determined for the work vehicle 10. The relationship between the load power requirement and the power produced by the engine 22 of the work vehicle 10 is provided below in Equation 1.

$$P_{engine} = P_{load} + P_{loss} \quad (1)$$

wherein, $P_{engine}$ corresponds to the engine power, $P_{load}$ corresponds to the load power requirement and $P_{loss}$ to the vehicle's power loss due to system inefficiencies, such as losses due to power consumption by the transmission and other power consuming components.

In one embodiment, the current load power requirement for the work vehicle may be determined indirectly by calculating the current engine power ($P_{engine}$) and the current power loss ($P_{loss}$) for the work vehicle 10. For example, as indicated above, the controller 116 may be configured to continuously monitor the engine speed and the engine torque (via sensors 122, 124), thereby allowing for the current engine power to be calculated by the controller 116. Additionally, as will be described below, the controller 116 may include component efficiency data stored within its memory that permits the controller 116 to calculate the current power loss for the work vehicle 10 based on the current vehicle operating parameters, such as the engine speed, ground speed, pressure differential within the hydrostatic unit 30, displacement ratio of the hydrostatic unit 30, the axle temperature and/or various other monitored and/or calculated operating parameters. As such, by determining the current engine power and the current engine power loss, the current power load requirement may be calculated using Equation 1.

Alternatively, the power load requirement may be determined directly by monitoring the output torque and the output speed of the work vehicle 10. For example, as indicated above with reference to FIG. 3, one or more sensors 128 may be associated with the drive axle assembly 26 to allow the axle torque and axle speed to be monitored, which may then be correlated to the current load power requirement for the work vehicle.

Additionally, the controller 116 may also be configured to forecast future load power requirements for the work vehicle 10, which may, in several embodiments, be advantageously utilized within the disclosed method 200 to enhance the vehicle's fuel efficiency. For example, a suitable forecasting algorithm may be stored within the controller's memory that allows it to determine the future load power requirement. Specifically, in one embodiment, the controller 116 may be configured to store several of the previously calculated load power requirements (e.g., the past 5 to 10 load power requirements calculated by the controller 116) and determine a recent trend for such power requirements using the forecasting algorithm, such as by using the algorithm to determine a best-fit or trend line for the previous load power requirements. The future load power requirement may then be predicted by analyzing the recent trend of the vehicle's power requirements.

Figure 5:
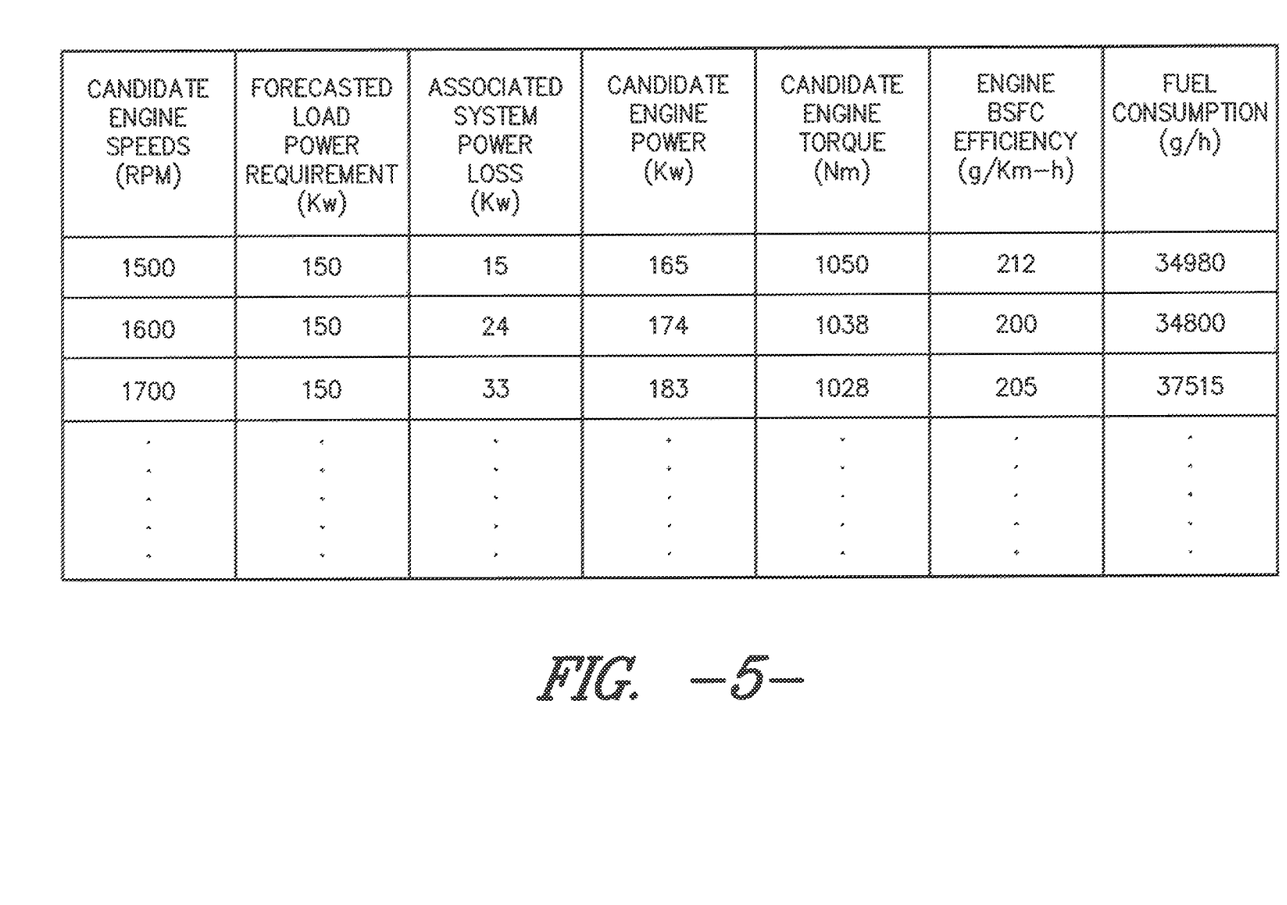
FIG. 5 illustrates a table providing an example of suitable data that may be utilized when implementing the disclosed method.

Referring still to FIG. 4, at 204, a plurality of candidate engine speeds may be determined based on the load power requirement. Specifically, in several embodiments, the forecasted load power requirement may be analyzed to determine which combination of engine operating parameters, particularly engine speed, may be utilized to achieve the vehicle's load requirement. As is generally understood, a plurality of different combinations of engine torque and engine speed may be utilized to provide a specific power requirement. For example, FIG. 5 illustrates a chart providing example data that may be utilized when implementing the disclosed method 200. As shown, for a given load power requirement (e.g., a 20 horsepower (Hp) load requirement), a plurality of different engine speeds may be commanded by the controller 116 to achieve such power requirement. These candidate engine speeds may then be utilized by the controller 116 to perform various calculations and/or make various determinations, as will be described below.

It should be appreciated that, as an alternative to utilizing the forecasted load power requirement, the controller 116 may be configured to utilize the current load power requirement as the basis for determining the candidate engine speeds. It should also be appreciated that the data provided in the chart shown in FIG. 5 is simply provided for purposes of describing one embodiment of the disclosed method 200 and, thus, should not be interpreted as limiting the present subject matter in any manner.

Additionally, at 206, suitable efficiency data for one or more of the components of the work vehicle 10 may be analyzed to determine a power loss value ($P_{loss}$) for each candidate engine speed (as shown in FIG. 5). Specifically, the power loss values may be determined based on the parasitic power losses associated with the various drivetrain components and/or other power consuming components of the work vehicle 10, with the total power loss for a given set of operating parameters being a function of the individual power losses associated with each power consuming component. For instance, Equation 2 provides an example of how the various component power losses that may be utilized to determine the overall power loss value for each candidate engine speed.

$$P_{loss} = P_{transmission} + P_{PTO} + P_{drive\ axle} + P_{fan} + P_{other} \quad (2)$$

wherein, $P_{transmission}$ corresponds to the power loss associated with the transmission 24 (which may include the power losses associated with both the hydrostatic unit 30 and the planetary unit 32), $P_{PTO}$ corresponds to the power loss associated with the PTO 110, $P_{drive\ axle}$ corresponds the power loss associated with the drive axle assembly 26, $P_{fan}$ corresponds to the power loss associated with the fan 106 and $P_{other}$ corresponds to the power loss associated with other power consuming components of the work vehicle 10.

In several embodiments, the individual component power losses and, thus, the total power loss value ($P_{loss}$) may be determined by analyzing specific efficiency data associated with each relevant component of the work vehicle 10. As is generally understood, the efficiency data for each component may be determined through experimentation, modeling and/or using any other suitable analysis technique and may be subsequently stored within the controller's memory. Additionally, the efficiency data, itself, may correspond to transfer functions, other mathematical formulas, tables, charts and/or any other suitable data that allows the controller 116 to determine the power loss associated with each component based on monitored and/or calculated operating parameters of the work vehicle 10.

Figure 6:
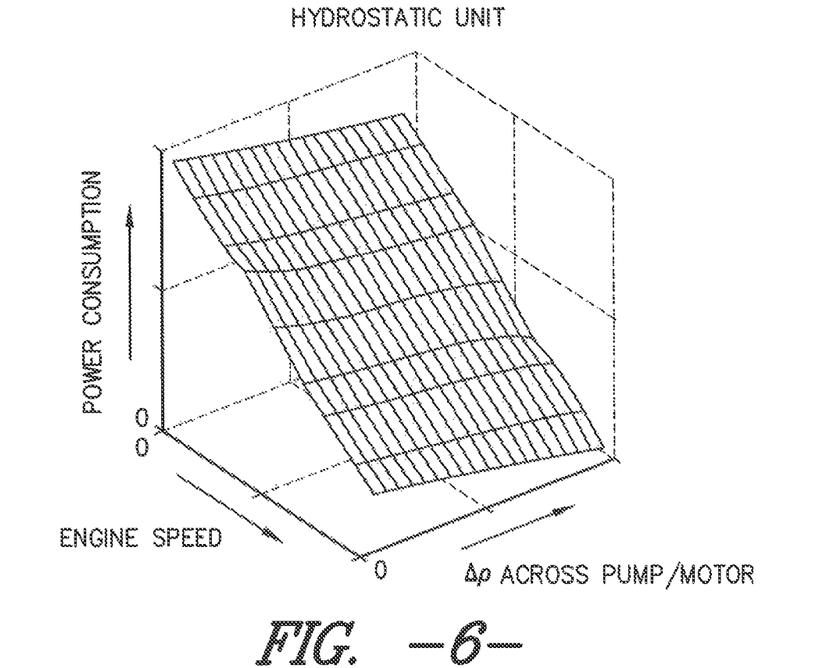
FIG. 6 illustrates a graph providing example efficiency data for the power consumption of a hydrostatic unit of a continuously variable transmission of a work vehicle.
Figure 7:
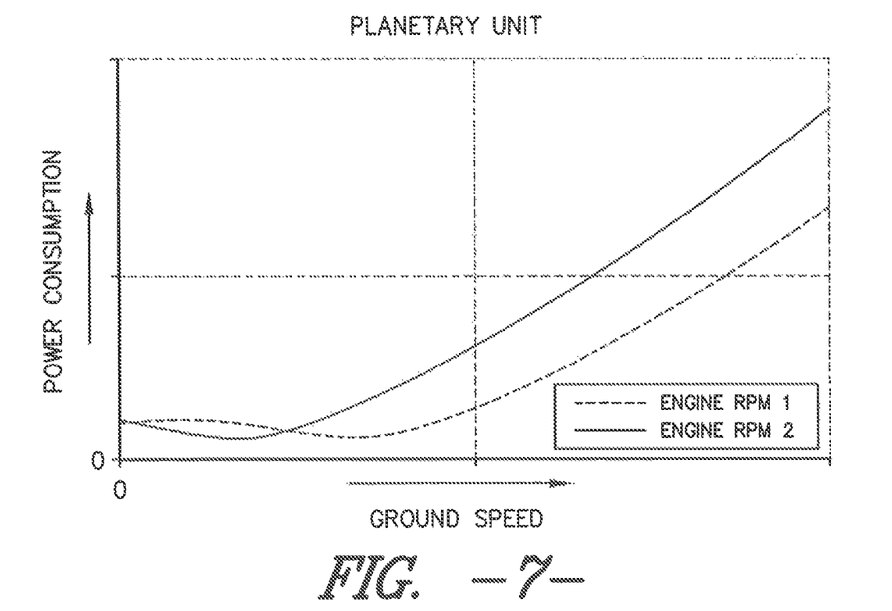
FIG. 7 illustrates a graph providing example efficiency data for the power consumption of a planetary unit of a continuously variable transmission of a work vehicle.
Figure 8:
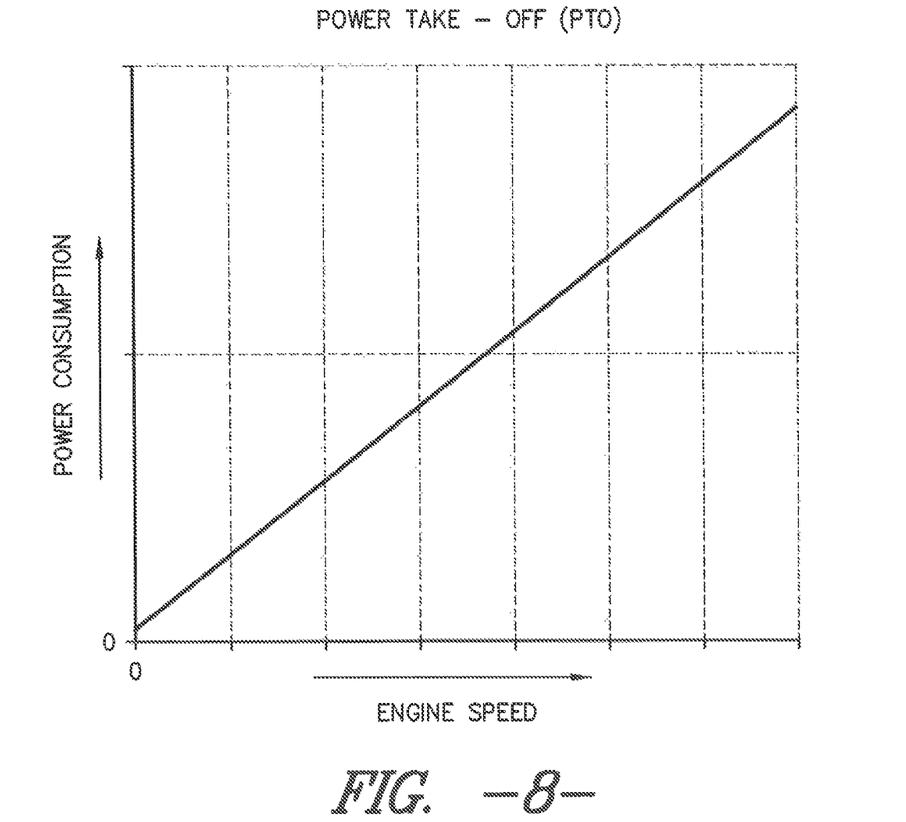
FIG. 8 illustrates a graph providing example efficiency data for the power consumption of a power take-off of a work vehicle.
Figure 9:
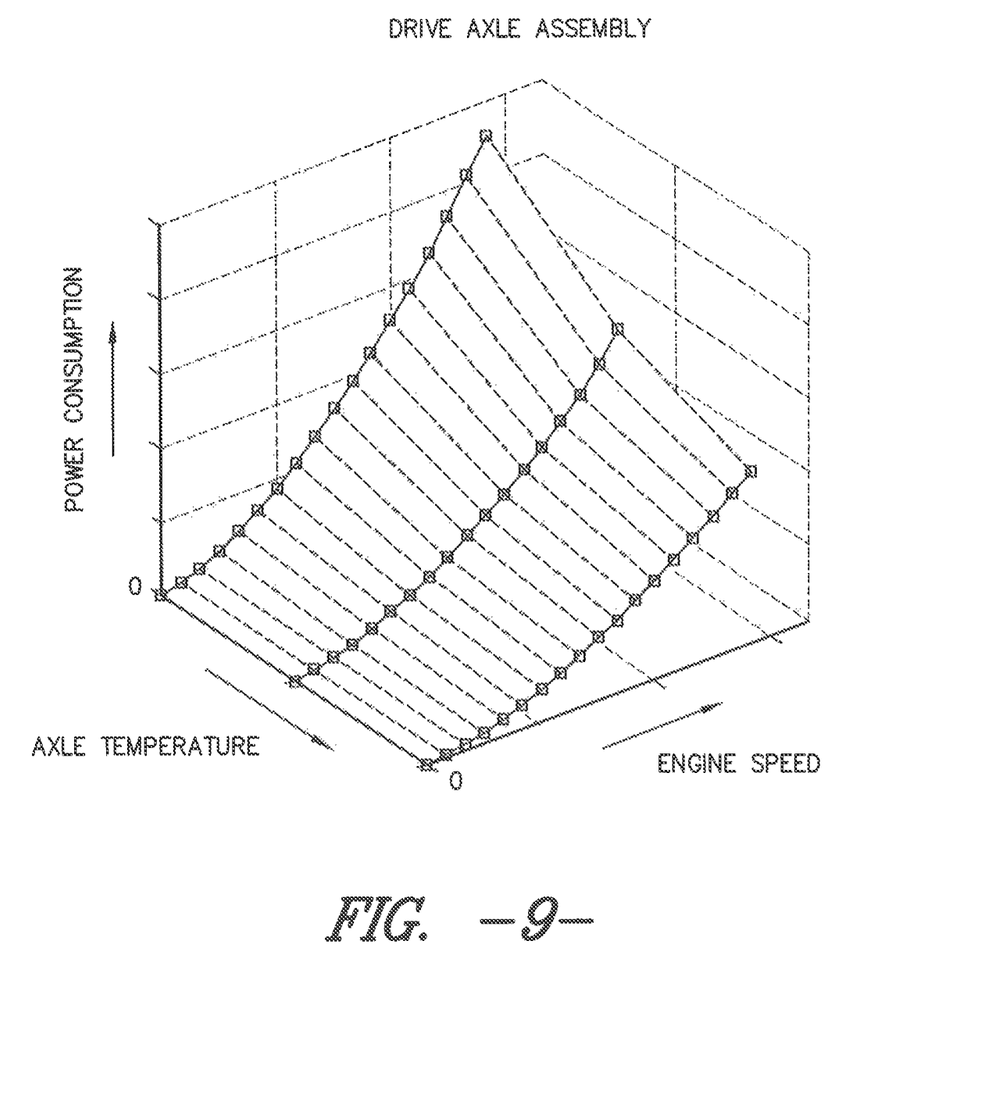
FIG. 9 illustrates a graph providing example efficiency data for the power consumption of a drive axle assembly of a work vehicle.
Figure 10:
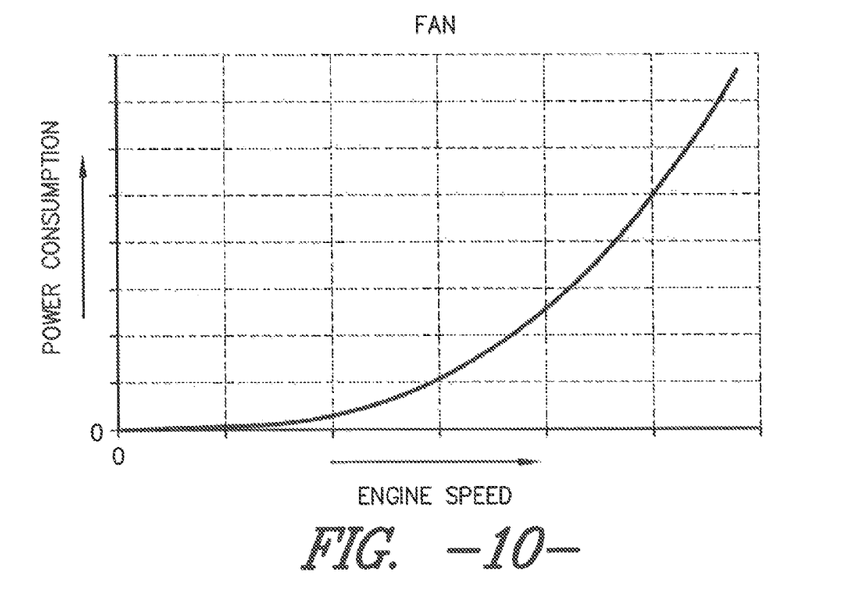
FIG. 10 illustrates a graph providing example efficiency data for the power consumption of a fan of a work vehicle.

For example, FIGS. 6-10 illustrate graphs providing example efficiency data associated with several components of the work vehicle 10. Specifically, FIG. 6 provides example efficiency data for the hydrostatic unit 30 of the transmission 24 that relates the power consumption of the unit 30 to the engine speed and the pressure differential across the pump/motor 36, 40 of the unit 30. As shown, the power consumption of the hydrostatic unit 30 may be inversely related to the engine speed and the pressure differential, with the power consumption generally decreasing with increasing engine speeds and/or increasing pressure differentials. Similarly, FIG. 7 provides example efficiency data for the planetary unit 32 of the transmission 24 that relates the power consumption of the unit 32 to the engine speed (only two example engine speeds being shown in FIG. 7) and the ground speed of the work vehicle 10. As shown, the power consumption of the planetary unit 32 may vary significantly at lower ground speeds and then may steadily increase as the ground speeds become higher. Additionally, FIG. 8 provides example efficiency data for the PTO 110 that relates its power consumption to the engine speed. As shown, the power consumption of the PTO 110 may vary generally linearly with changes in engine speed. Moreover, FIG. 9 provides example efficiency data for the drive axle assembly 26 that relates its power consumption to the engine speed and the axle temperature. As shown, the power consumption of the drive axle assembly 26 may generally increase with increasing engine speeds and/or decreasing axle temperatures. Further, FIG. 10 provides example efficiency data for the fan 106 that relates its power consumption to the engine speed. As shown, the power consumption of the fan 106 may generally increase as the engine speed is increased.

It should be readily understood that the relationships provided in FIGS. 6-10 are simply provided as generic examples illustrating how the power consumption of a given vehicle component may generally vary with changes in one or more vehicle operating parameters. One of ordinary skill in the art should appreciate that the actual relationships existing between the power consumption of specific vehicle components and the vehicle operating parameter(s) may vary based on numerous factors including, but not limited to, the type of vehicle in which the components are being used and/or the specific component configurations. It should also be appreciated that, in addition to the vehicle operating parameter(s) shown in FIGS. 6-10, the power consumption of the vehicle components may also vary as a function of one or more other operating parameters. For example, the power consumption of the hydrostatic unit 30 may also vary as a function of the pump/motor displacement ratio.

Referring back to FIG. 4, at 208, a candidate engine power may be determined for each of the candidate engine speeds. In particular, for the specific load power requirement determined at 202, the controller 116 may be configured to calculate candidate engine powers based on the power loss values determined at 206. For example, using Equation 1, each candidate engine power may be equal to the summation of the load power requirement and the associated power loss value. Thus, as shown in the example of FIG. 5, for a load power requirement of 20 Hp, the candidate engine powers may be determined by simply adding each power loss value to the load power requirement. As such, a power loss value and a candidate engine power may be associated with each candidate engine speed.

It should be appreciated that, in several embodiments, the controller 116 may be configured to perform a global search when determining the candidate engine speeds (204), power loss values (206) and/or the candidate engine powers (208). For instance, the controller 116 may be configured to consider every possible combination of engine speeds and torques for each possible transmission ratio (or a smaller subset of such combinations/ratios) within the working ranges of the vehicle 10 in order create a large pool of candidate settings for achieving the best fuel efficiency. Thus, unlike conventional control systems that simply perform a local search of engine settings within a specific gear range, the disclosed system and method may provide a global optimization strategy.

Figure 11:
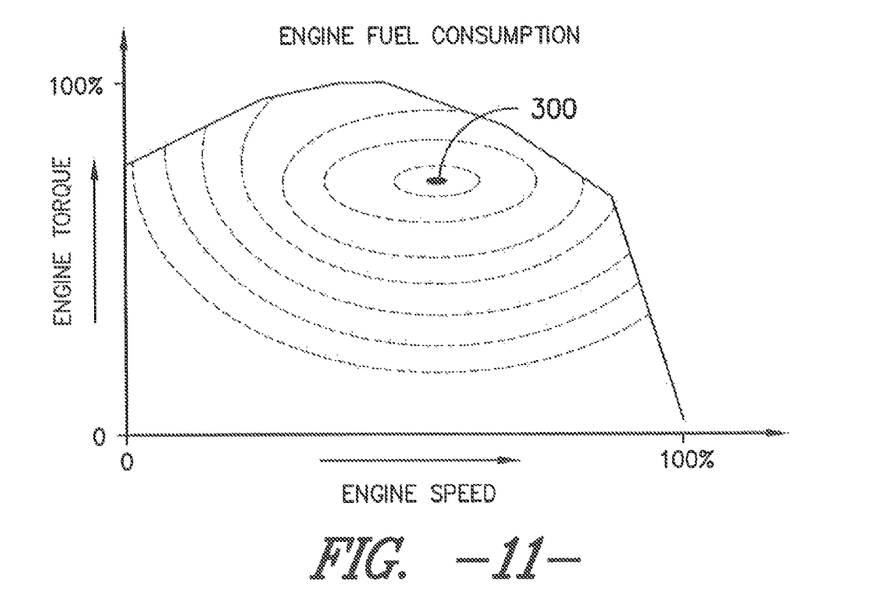
FIG. 11 illustrates a chart providing example efficiency data for the fuel consumption of an engine of a work vehicle.

Additionally, at 210, fuel efficiency data may be analyzed to determine a target engine speed for the work vehicle 10 based on the candidate engine powers. Specifically, in several embodiments, a candidate engine torque (as shown in FIG. 5) may be determined by the controller 116 for each pair of candidate engine powers and speeds (e.g., by dividing each candidate engine power by its associated engine speed). Each set of engine torques and engine speeds may then be utilized to determine the most fuel efficient engine settings for achieving the desired load power requirement. For example, FIG. 11 illustrates an example of a fuel consumption map for an engine (e.g., engine 22). As is generally understood, the fuel/power conversion efficiency or brake specific fuel consumption (bsfc) of an engine may vary at different engine settings (i.e., at different combinations of engine speed and engine torque). For example, as shown in FIG. 11, each engine may have an optimal efficiency point 300 at which the fuel efficiency of the engine is maximized (i.e. at the minimum bsfc value). As such, it is generally desirable to adjust the engine settings such that the intersection of the engine torque and engine speed is closest to the optimal efficiency point 300.

Thus, in several embodiments, suitable fuel efficiency data (e.g., in the form of fuel consumption maps, data tables, mathematical functions and/or the like) may be stored within the controller 116 and may be utilized to determine the optimal engine settings based on the candidate engine speeds and associated candidate engine torques (derived from the candidate engine powers). For example, for each pair of candidate engine speeds and torques, the controller 116 may determine the fuel consumption of the engine 22 by referencing the fuel consumption map or other suitable fuel efficiency data. Thereafter, the controller 116 may select the candidate engine speed/torque pair that maximizes fuel efficiency (i.e., the pair intersecting closest to the optimal fuel efficiency point 30) as the target engine speed and target engine torque for producing the engine power necessary to achieve the load power requirement.

For instance, as shown in FIG. 5, a bsfc value and/or a fuel consumption value may be determined for each pair of candidate engine speeds and torques. The bsfc values and/or fuel consumption values may then be analyzed and/or compared to determine the combination of engine settings that minimizes fuel consumption. For example, Equation 3 provides a mathematical relationship for the overall efficiency of the disclosed system, $\eta_{system}$. As shown, since the power load requirement ($P_{load}$) is an input into the system, the system efficiency may be maximized by minimizing the fuel consumption (i.e., by minimizing the bsfc values). Thus, in several embodiments, the controller 116 may be configured to utilize the objective function provided below in Equation 4 in order to determine the target engine settings based on the corresponding bsfc values.

$$\eta_{system} = \frac{P_{load}}{\text{fuel consumption}} = \frac{P_{load}}{P_{engine} * bsfc} = \frac{P_{load}}{P_{Load} * bsfc + P_{loss} * bsfc} \quad (3)$$

$$\min\{P_{Load} * bsfc + P_{loss} * bsf\} \quad (4)$$

Upon determining the target engine settings, the controller 116 may then adjust the transmission ratio of the transmission 24 to ensure that the desired ground speed is maintained. For example, as indicated above, the desired ground speed may be input by the operator via a suitable input device 120. Thus, by knowing the desired ground speed and the target engine speed, the required transmission ratio may be determined by the controller 116. For example, Equation 5 provides an example relationship that may be utilized by the controller 116 to determine the necessary transmission ratio.

$$GS = ES*TR*k \quad (5)$$

wherein, GS corresponds to the desired ground speed, ES corresponds to the engine speed, TR corresponds to the transmission ratio and k corresponds to a constant associated with the final drive ratio and the size of the vehicle's tires.

It should be appreciated that, by taking into consideration component efficiencies other than the engine's efficiency, the overall efficiency of the work vehicle 10 may be significantly improved. For example, using the disclosed method 200, it may be discovered that the most fuel efficient settings for the engine 22 may not result in the lowest fuel consumption for the vehicle 10 given the current load power requirement and/or other operating parameters. This may be due to the fact, for instance, that the power consumption of the transmission and/or other power consuming components of the work vehicle is heightened at such settings. Accordingly, by considering the various individual component efficiencies, engine settings may be selected that minimize fuel consumption without impacting vehicle performance and/or productivity.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for reducing a fuel consumption of a work vehicle, the method comprising:
determining, with a controller, a load power requirement for the work vehicle, wherein determining the load power requirement for the work vehicle comprises forecasting the load power requirement based at least in part on a current load power requirement;
determining a plurality of candidate engine speeds at which the load power requirement is achievable;
analyzing stored efficiency data for a transmission and at least one additional component of the work vehicle to determine a power loss value for each candidate engine speed;
determining a candidate engine power for each candidate engine speed based on the load power requirement and the power loss values; and
analyzing stored fuel efficiency data based on the candidate engine powers to determine a target engine speed for the work vehicle; and
adjusting a transmission ratio of the transmission based in part on the target engine speed.

2. The method of claim 1, further comprising:
determining a current engine power for the work vehicle;
determining a current power loss value for the work vehicle based on the stored efficiency data; and
determining the current load power requirement for the work vehicle based on the current engine power and the current power loss value.

3. The method of claim 1, further comprising receiving a speed command signal associated with a desired ground speed for the work vehicle.

4. The method of claim 3, wherein the transmission ratio of the transmission is adjusted based on the target engine speed and the desired ground speed.

5. The method of claim 1, wherein analyzing stored efficiency data for a transmission and at least one additional component of the work vehicle comprises analyzing stored efficiency data for the transmission and at least one of a fan, a drive axle assembly or a power take-off of the work vehicle.

6. The method of claim 1, wherein the stored efficiency data for the transmission includes efficiency data for both a hydrostatic unit of the transmission and a planetary unit of the transmission.

7. The method of claim 1, wherein analyzing stored fuel efficiency data based on the candidate engine powers comprises:
determining a candidate engine torque associated with each set of candidate engine powers and candidate engine speeds; and
analyzing the stored fuel efficiency data based on the candidate engine torques and candidate engine speeds to determine the target engine speed.

8. The method of claim 7, wherein analyzing the stored fuel efficiency data based on the candidate engine torques and candidate engine speeds comprises referencing a fuel consumption map for an engine of the work vehicle based on the candidate engine torques and candidate engine speeds.

9. A method for reducing a fuel consumption of a work vehicle, the method comprising:
determining, with a controller, a load power requirement for the work vehicle, wherein determining the load power requirement comprises forecasting the load power requirement based on previously determined load power requirements;
analyzing stored efficiency data for a transmission and at least one additional component of the work vehicle to determine a plurality of power loss values associated with achieving the load power requirement;
determining candidate engine settings based on the load power requirement and the power loss values;

analyzing stored fuel efficiency data based on the candidate engine settings to determine a target engine speed for the work vehicle;

receiving a speed command signal associated with a desired ground speed for the work vehicle; and adjusting a transmission ratio of the transmission based on the target engine speed and the desired ground speed.

10. A system for reducing a fuel consumption of a work vehicle, the system comprising:
an engine;
a transmission coupled to the engine; and
a controller communicatively coupled to the engine and the transmission, the controller being configured to:
determine a load power requirement for the work vehicle;
determine a plurality of candidate engine speeds at which the load power requirement is achievable;
analyze stored efficiency data for the transmission and at least one additional component of the work vehicle to determine a power loss value for each candidate engine speed;
determine a candidate engine power for each candidate engine speed based on the load power requirement and the power loss values;
analyze stored fuel efficiency data for the engine based on the candidate engine powers to determine a target engine speed for the work vehicle; and
forecast the load power requirement based on previously determined load power requirements.

11. The system of claim 10, further comprising an input device communicatively coupled to the controller, the input device being configured to permit an operator to provide a speed command signal to the controller corresponding to a desired ground speed for the work vehicle.

12. The system of claim 11, wherein the controller is configured to adjust a transmission ratio of the transmission based on the target engine speed and the desired ground speed.

13. The system of claim 10, wherein the at least one additional component comprises at least one of a fan, a drive axle assembly or a power take-off of the work vehicle.

14. A system for reducing a fuel consumption of a work vehicle, the system comprising:
an engine;
a transmission coupled to the engine; and
a controller communicatively coupled to the engine and the transmission, the controller being configured to:
determine a load power requirement for the work vehicle;
determine a plurality of candidate engine speeds at which the load power requirement is achievable;
analyze stored efficiency data for the transmission and at least one additional component of the work vehicle to determine a power loss value for each candidate engine speed, wherein the stored efficiency data for the transmission includes efficiency data for both a hydrostatic unit of the transmission and a planetary unit of the transmission;
determine a candidate engine power for each candidate engine speed based on the load power requirement and the power loss values; and
analyze stored fuel efficiency data for the engine based on the candidate engine powers to determine a target engine speed for the work vehicle.

15. The system of claim 10 wherein the controller is further configured to determine a candidate engine torque associated with each set of candidate engine powers and candidate engine speeds.

16. The system of claim 15, wherein the stored fuel efficiency data is analyzed based on the candidate engine torques and the candidate engine speeds to determine the target engine speed.

17. The system of claim 10, wherein the fuel efficiency data corresponds to a fuel consumption map of the engine.

* * * * *